United States Patent [19]
Myer

[11] 3,806,899

[45] Apr. 23, 1974

[54] MAGNETORESISTIVE READOUT FOR DOMAIN ADDRESSING INTERROGATOR

[75] Inventor: Jon H. Myer, Woodland Hills, Calif.

[73] Assignee: Hughes Aircraft Company, Culver City, Calif.

[22] Filed: Apr. 10, 1972

[21] Appl. No.: 242,474

[52] U.S. Cl.340/174 EB, 340/174 TF, 340/174 MA, 340/174 PM, 340/174 JA

[51] Int. Cl. .......... G11c 11/14

[58] Field of Search .......... 340/174 TF, 174 MA, 340/174 EB, 340/174 PM, 174 JA, 174 M, 174 CC

[56] References Cited

UNITED STATES PATENTS

| | | | |
|---|---|---|---|
| 3,498,764 | 3/1970 | Khai | 340/174 CC |
| 3,636,531 | 1/1972 | Copeland | 340/174 TF |
| 3,676,872 | 7/1972 | Lock | 340/174 TF |
| 3,691,540 | 9/1972 | Almasi et al. | 340/174 TF |

OTHER PUBLICATIONS

IBM Technical Disclosure Bulletin, "Composite Cylindrical Magnetic Domain Materials" by Ahn et al.; Vol. 13, No. 11, 4/71, p. 3,220.

*Primary Examiner*—Stanley M. Urynowicz, Jr.
*Attorney, Agent, or Firm*—W. H. MacAllister, Jr.; Donald C. Keareney

[57] ABSTRACT

There are disclosed digital data processing and memory devices wherein the detection of one or more cylindrical uniaxial magnetic domains each representing a stored bit of digital data in a first crystal platelet or sheet of magnetic material is accomplished by detecting the presence or absence of a corresponding cylindrical uniaxial magnetic domain in a second associated crystal platelet or sheet of magnetic material which is positioned in magnetically coupled relation to the first so that the resulting magnetic field produced by the coaction of the two domains is in turn detectable by an appropriately positioned thin film magnetoresistive element, the resistance of which varies in accordance with the vector relation between the current flow in the magnetoresistor and the magnetic field traversing it.

12 Claims, 9 Drawing Figures

MAGNETORESISTIVE READOUT FOR DOMAIN ADDRESSING INTERROGATOR

BACKGROUND OF THE INVENTION

1. Field of the Invention

This invention relates to digital data processing, storing and signal translating devices utilizing cylindrical magnetic domains (commonly called magnetic bubbles) in a uniaxially anisotropic magnetic medium such as a single crystal platelet. Such devices are particularly useful in providing an orthogonal or random access high speed non-destructive readout memory. They may also be used for comparators and for many other logic configurations. The present invention relates particularly to the use of a juxtaposed pair of such platelets coacting with an interposed magnetoresistive element to provide a nondestructive readout in a device occupying a minimum volume and having maximum detection sensitivity.

2. Prior Art

In my copending patent application Ser. No. 205,095, filed Dec. 6, 1971, entitled "Magneto-Optical Devices" I have disclosed an analogous class of logic and memory devices also using magnetic bubbles or single wall domains in various plane magnetic media but relying primarily on optical readout techniques rather than the magnetoresistive technique disclosed herein. Specifically different devices of primarily a serial shift register nature but which also use such magnetic domains, have also been described in an article which appeared in the June 1971 issue of the magazine "Scientific American" written by A. H. Bobeck and H.E.D. Scovil and entitled "Magnetic Bubbles." U.S. Pat. No. 3,513,452 issued to Brobeck et al, on May 19, 1970 does relate to an orthogonal array rather than a serial shift register, but it discloses only such an array in a single platelet utilizing inductive readout techniques which are inherently less sensitive, require a larger number of access and drive conductors, and hence provide less storage capacity in terms of bits per unit volume.

A combined packaging, magnetic biasing, and electrical connector structure is disclosed and claimed in my patent application entitled "Packaging Structure for Movable Magnetic Domain Devices" which is being filed concurrently herewith and which discloses and claims a packaging-biasing-connector structure suitable for use with any of the devices discussed herein or in the prior art noted above.

SUMMARY OF THE INVENTION

The present invention relates to a magnetoresistive readout arrangement for such two platelet magnetic bubble devices which utilizes the combined magnetic field producing qualities of correspondingly positioned bubbles in each of two magnetically coupled magnetic media to produce field pattern changes which afford a sensitive and high signal to noise readout signal in devices such as a mass memory. The locally controlled motion between two contiguous alternate bit positions of a cylindrical magnetic domain in one magnetic crystal platelet is used to produce in a magnetoresistive sensor element a signal the nature of which depends upon the presence or absence in a predetermined corresponding position of a cylindrical domain in another adjacent similar platelet. The first platelet is provided with an orthogonal conductor array to control domain position at each intersection and serves as a memory. The second platelet is provided with a similar conductor array and serves as the interrogator. Each magnetic domain supporting crystal is a uniaxial anisotropic ferromagnetic crystal platelet, such as yttrium orthoferrite, having its major plane surface cut perpendicularly to its easy axis of magnetization.

The magnetoresistive readout arrangement of this invention is particularly suited to the detection of a large number of domains on a large number of such platelets simultaneously. In such applications optical readouts can become quite bulky and inductive loops must be large to provide the necessary sensitivity. Inductive loops are also limited to the dynamic detection of change of flux and are unable to sense the presence or absence of a stationary domain. The magnetoresistive sensor disclosed herein in which the resistance of a thin film is changed by the proximity of two domains, combines the feature of simplicity and small size in a mass memory having high speed random access nondestructive readout with high signal to noise ratio output which is available as either a steady state or d.c. signal and/or as a dynamic or a.c. signal.

BRIEF DESCRIPTION OF THE DRAWINGS

The invention will be better understood from the detailed description below taken in conjunction with the drawings wherein like reference characters refer to like parts throughout and in which.

FIGS. *2a*, *2b* and *2c* (sheet 4) are diagrammatic views illustrating three possible vector relationships between a magnetic field H and the current I flowing in a thin film magnetoresistive conductor.

Figure 1:
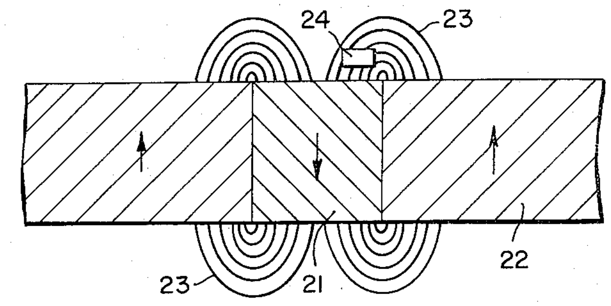
FIG. 1 is a fragmentary sectional view through a crystal platelet showing a magnetic bubble therein and indicating the relationship of the lines of flux of the magnetic field of the bubble to a magnetoresistive sensor positioned adjacent to the platelet.

FIG. *3a* is a fragmentary sectional view through similar crystal platelet similar to that of FIG. 1 but showing the effect on the magnetic field of the bubble when a second crystal platelet without a correspondingly positioned bubble is positioned adjacent to the first.

FIG. *3b* is a view similar to FIG. *3a* but wherein the second platelet does have a correspondingly positioned magnetic bubble adjacent to the magnetic bubble in the first platelet.

Figure 4:
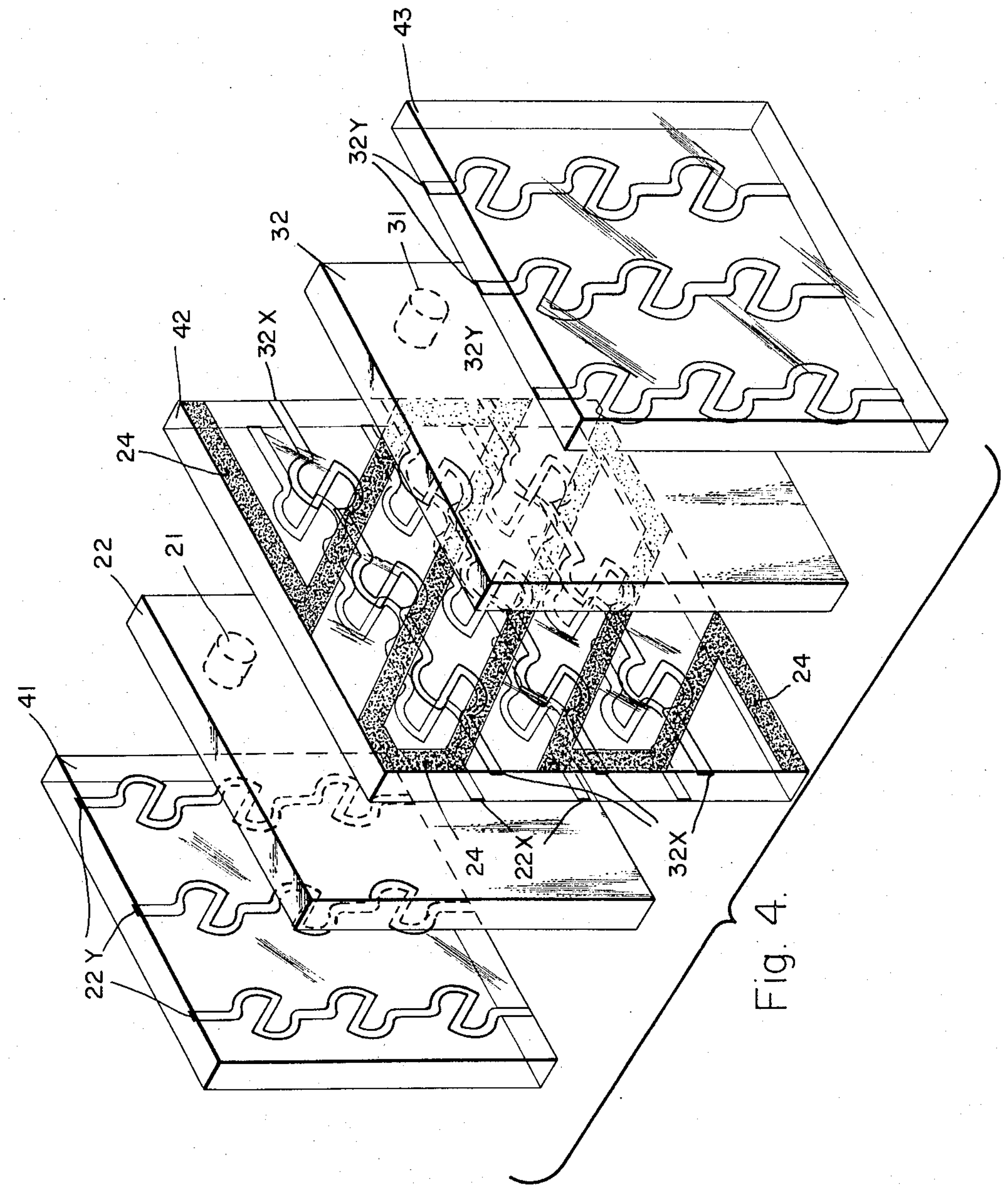

FIG. 4 is an exploded perspective view of two crystal platelets and three glass plates having conductor arrays thereon such that when assembled the entire device will function as a high speed random access nondestructive readout memory.

Figure 5:
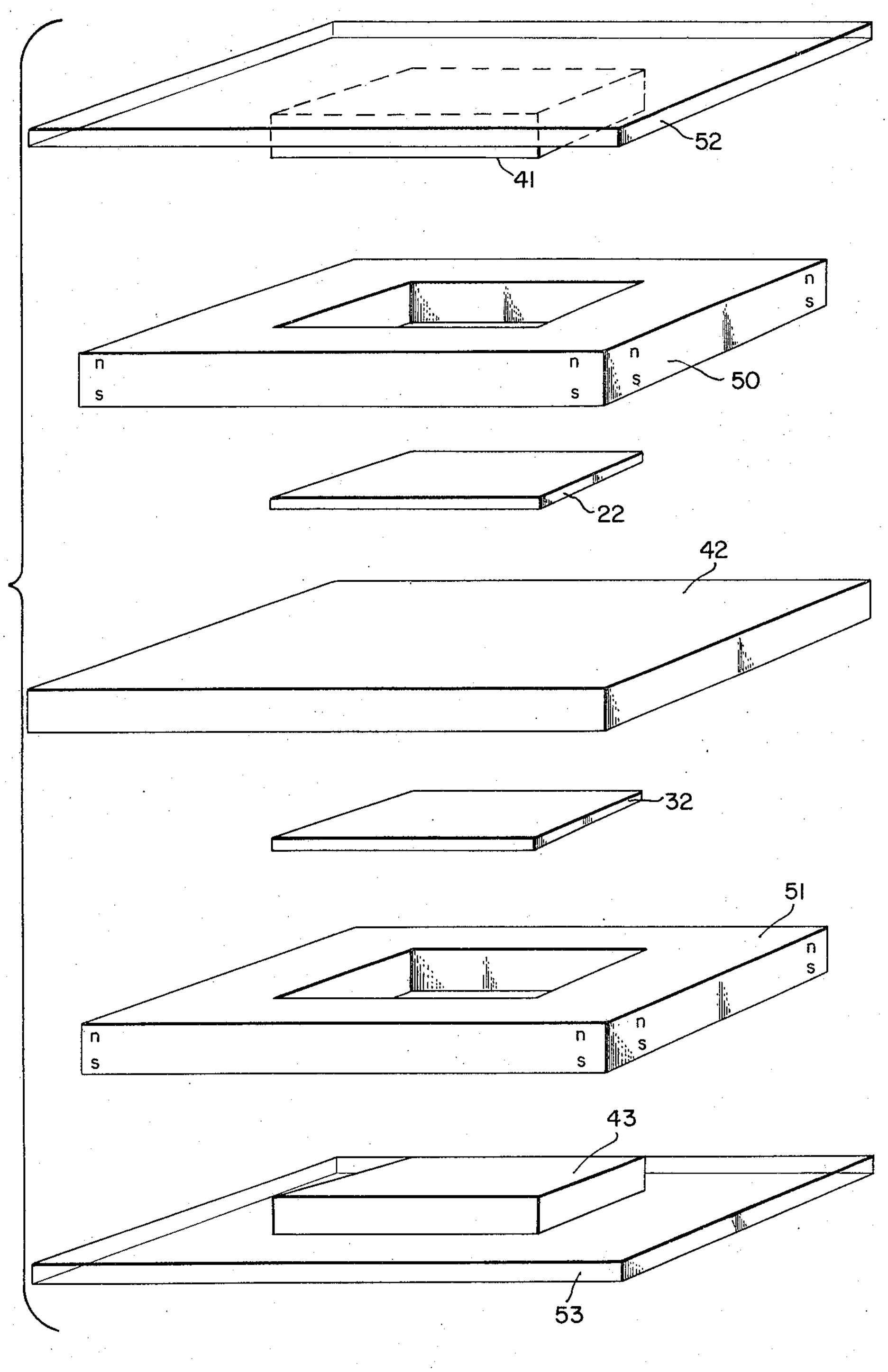

FIG. 5 is an exploded perspective view showing the manner in which the plates and platelets of FIG. 4 are assembled in a biasing magnet and packaging structure.

Figure 6:
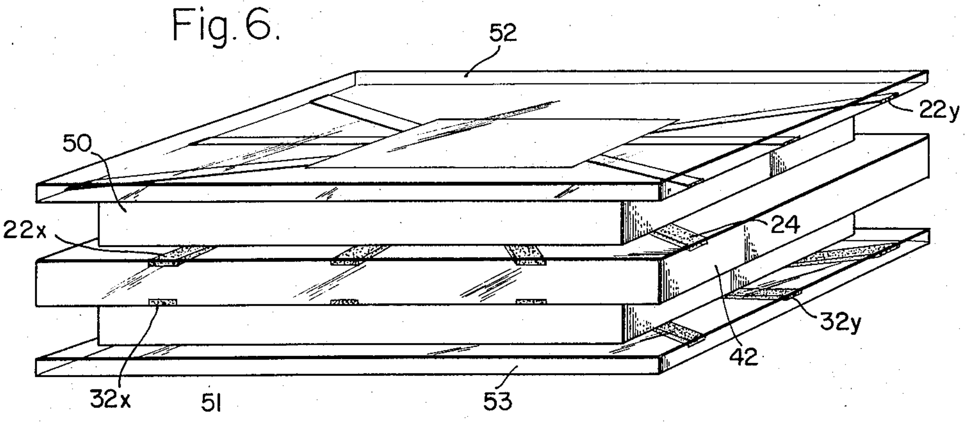

FIG. 6 is an assembled perspective view of the components of FIG. 5.

Turning now to FIG. 1, it will be seen that the magnetic field 23 of a cylindrical domain 21 in a magnetic domain supporting crystal platelet 22 (which may, for example, be an yttrium orthoferrite crystal cut as disclosed in my copending application Ser. No. 205,095) extends into the space above and below the platelet as indicated by the flux lines of field 23. A thin film magnetoresistive sensor 24 which is sensitive to in-plane flux lines when placed adjacent to the crystal platelet and cylindrical domain 21 as shown in FIG. 1 will be barely affected since most of the flux lines pass through it perpendicularly to its plane.

Figure 2:
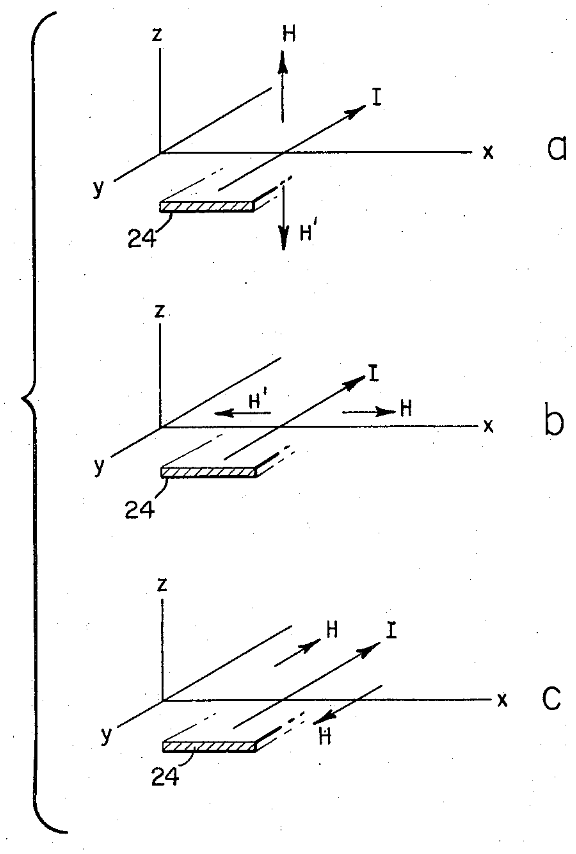

Materials suitable for use as magnetoresistive sensors of the type being discussed herein are commercially available and are primarily alloys of iron and nickel. The alloy composition may range from 25 percent iron and 75 percent nickel to 10 percent iron and 90 percent nickel. The preferred or most sensitive limits of the range, however, are defined by alloys having not more than 20 percent iron and 80 percent nickel, and not less than 15 percent iron and 85 percent nickel. It is also possible to use an alloy in which 4 percent of molybdenum has been included with 78.8 percent nickel and 17.2 percent iron. Such magnetoresistive materials when extended in a thin film in a plane are sensitive (by way of changes in the value of resistance of the material) to changes in the direction of the magnetic field in the plane of the measuring current. The resistance of the material is at its highest value when the flux lines are in the plane of the measuring current and perpendicular to the direction of flow of the measuring current in the elongated thin film conductor as diagrammatically shown in FIG. 2b. The resistance has its lowest value when the flux lines are in the plane of the measuring current and are parallel or anti-parallel to the flow of the measuring current as shown in FIG. 2*c*. This minimum value is also exhibited when flux lines are perpendicular to the plane of the current as in FIG. 2a. The resistance values can decrease by as much as ½ percent to 5 percent when the direction of magnetization is rotated in or out of the plane by 90° from the direction perpendicular the measuring current and in the plane thereof, that is, from the vector relation which produces maximum resistance value. For a more complete discussion of the phenomenon of magnetoresistance per se reference is made to an article by E. N. Mitchell et al, in the "Journal of Applied Physics" at page 2,604 of Vol. 35, September (1964). Reference is also made to an article by Almasi et al in the "Journal of Applied Physics" at page 1,268 of Vol. 42, March 1971.

Figure 3A:
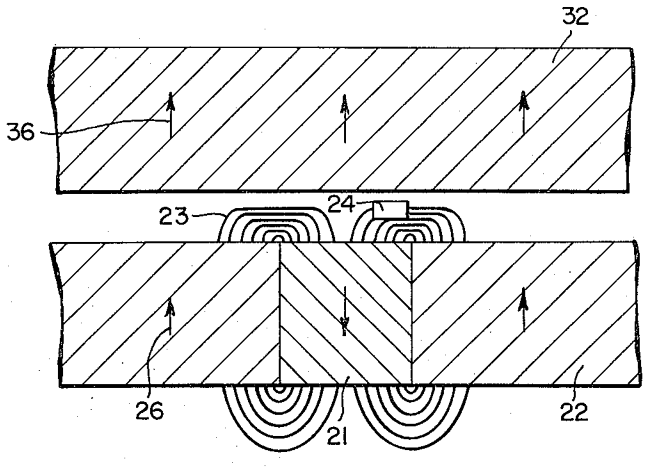

In FIG. 3*a* a second scanning and interrogating platelet 32 is shown positioned adjacent to the memory platelet 22. When no domain is present in the interrogating platelet 32, the flux lines 23 of the memory domain 21 will be distorted as shown in FIG. 3a causing an increase in the resistance of the magnetoresistive sensor 24 as discussed above. This distortion or "squashing" of the flux line of course arises from the fact that the bias fields in both the memory platelet 22 and the interrogating platelet 32 have the same direction, whereas the field of the memory cylindrical domain 21 has an opposite direction. Hence, when the interrogating platelet 32 has no cylindrical domain in it positioned opposite the cylindrical domain 21 in the memory platelet 22 the local fields are opposing thereby causing a squashing of the flux lines and creating flux components in the plane of the surface of the platelet on which the magnetoresistor is deposited, most of which are transverse to the thin film magnetoresistor conductor 24.

Figure 3B:
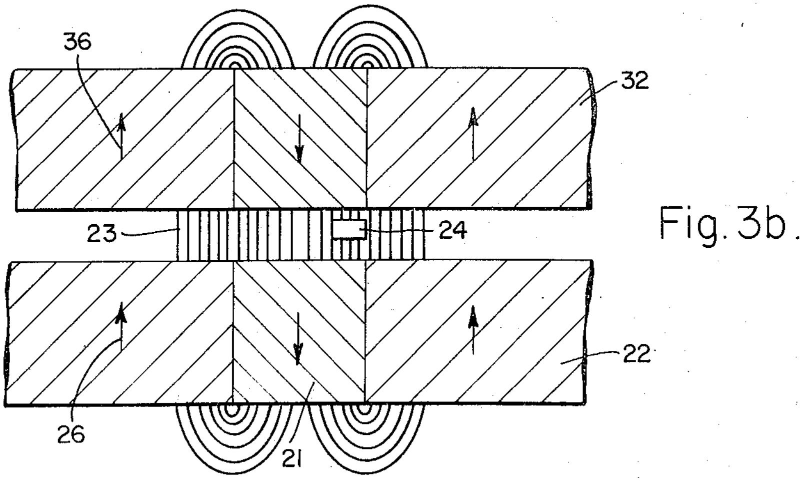

In FIG. 3*b* there is shown the flux line condition when an interrogating domain 31 is juxtaposed to the memory domain 21. The flux lines now penetrate the magnetoresistive sensor 24 as shown perpendicularly to its plane and hence have no effect on the resistance of the element 24.

In this relative configuration of current flow and flux line, which is of the type shown in FIG. 2a, the magnetic field has negligible effect on the resistance and the sensing element has its standard or lower resistance value. Removal of the interrogating domain 31 and returning thereby to the condition illustrated in FIG. 3a will again increase the resistance of the magnetoresistive sensor since at least the major components of the radial flux pattern is transverse to the flow of current and in the plane of the thin film 24. As can be seen in the drawings, in the state illustrated by FIG. 3*b* the flux lines of the bias fields 26 and 36 are shared by both the interrogating and the memory platelets in a continuous pattern since both the bias field in the main platelets and the oppositely directed fields of the juxtaposed cylindrical domains are respectively in aiding relationship so as to form a continuous magnetic path for the flux.

It will thus be seen that the concept of the magnetoresistive sensing by "flux line squashing" allows the interrogation of the memory plane or platelet without disturbing the stored bits therein, thus greatly reducing the chances of the introduction of error. The truth table for these devices, adopting the convention that the presence of a cylindrical domain in either platelet is representative of a binary one whereas the absence of a domain is representative of a binary zero and that (as with a constant voltage drive for the readout circuit) a low resistance hence high current in the magnetoresistor represents a one whereas a high resistance or low current represents a zero, is as follows:

| | Interrogator 1 | Interrogator 0 |
|---|---|---|
| Memory | Output | |
| 1 | 1 | 0 |
| 0 | 0 | 1 |

It is thus seen that the logic of these devices is equivalent to that of the two platelet memory and correlator devices shown in my copending application Ser. No. 205,095. The magnetoresistive readout technique, however, is more compact and often more convenient than the optical readout disclosed therein.

A typical array implementing these principles is shown in FIG. 4. The domain holding and drive conductor patterns are carried by three insulator plates 41, 42 and 43, respectively. The first domain containing platelet 22 is positioned between the first and second insulator plates 41 and 42 whereas the second domain containing or interrogator platelet 32 is positioned between the second and third insulator plates 42 and 43, respectively. The drive conductor patterns are shaped and configured to provide two alternate positions at each bit location defined by the intersection of the X and Y patterns as illustrated in the drawing and in the same manner as is described in my above noted previously filed patent application Ser. No. 205,095.

In preparing this all-electronic, rather than electro-optical device, however, it is preferred to submerge these drive conductor patterns into the insulating plates 41, 42 and 43 so as to prevent scratching of adjacent plates and to minimize required volume. The drive conductor pattern is preferably etched into the surface of the glass plates so as to form a small groove of the illustrated configuration therein and conductive metals such as gold, silver, copper or aluminum are then mask deposited into the grooves. As shown in FIG. 4 an orthogonal array is formed by so forming the drive conductor pattern 22*y* on insulator plate 41 and 22*x* on one side of insulator plate 42. Conductor patterns 22*x* and 22*y* in the assembled form of device in which the platelets are firmly juxtaposed generate switching fields for cylindrical magnetic domains or bubbles such as the domain 21 in the crystal platelet 22. As explained in my earlier filed application, the coincident current threshold switching from one bit position to another of each of the intersection points of the *x* and *y* arrays has the same threshold logic as is now used in random access ferrite core memories. As has been noted, however, this memory device, unlike the ferrite core devices, also affords a non-destructive readout. No magnetic latching or holding bars of the type shown in my earlier case are shown herein since it is possible to rely on the local crystal coercivity to replace these auxiliary coercive film bar patterns if desired.

Non-destructive readout is achieved by providing on the opposite surface of plate 42 the conductor array 32x and on the inner surface of plate 43 the conductor array 32y. It will be obvious that the direction of the conductor arrays are indicated by the suffixes *x* or *y* and that the crystal platelet with which they are associated is indicated by the numerals 22 or 32, respectively. Thus, the conductor arrays 22*x* on plate 42 and 22*y* on plate 41 serve to define two alternate bit positions at each of their intersection points as projected into crystal platelet 22 which is sandwiched between insulator plates 41 and 42. Similarly, conductor arrays 32x and 32y serve to define two alternate bit positions at each of their intersection points as projected into crystal platelet 32 which is sandwiched between insulator plates 42 and 43 on which the arrays are formed.

The magnetoresistive sensing element 24 may be deposited on either side of the central insulating plate 42 after having deposited a suitable insulating layer over the conductor array which has been etched into the surface of the plate. The magnetoresistive sensor 24 is shown in a continuous diagonal or serpentine pattern similar to the readout conductor used now in ferrite core memories so that a change of resistance at any location along its length will be reflected in a changed signal derived from the currents flowing in the sensor, the location of resulting resistance changes being defined by knowing which conductors of the array 32*x*-32*y* have been interrogated at that instant. Thus, if we consider the orthoferrite platelet 22 as the memory with a "memory bit 21", we can interrogate it by juxtaposing an "interrogating bit 31" on the interrogating platelet 32 to generate a signal in the magnetoresistor 24 in the manner discussed above in connection with the earlier sectional views. The interrogating domain in any selected bit position is moved by actuating the appropriate leads in the 32*x* - 32*y* array in the manner explained above to move the interrogating bit from its quiescent "zero" position to a "one" position to produce the memory readout indicated in the truth table above.

The separation of storage and interrogation functions permits a wide variety of memory organizations. First, true random bit addressing can be obtained by superimposing two isolated magnetoresistor line arrays (one in the X and the other in the Y direction) which requires 6 $\sqrt{n}$ terminals, where *n* is the number of bits stored.

Secondly, it is possible to squash the flux lines by a single coil covering the whole platelet and detect with two magnetoresistor arrays as above. This requires 4 $\sqrt{n} + 2$ terminals.

A third alternative (which is illustrated in detail herein) is to connect one line array of magnetoresistors in a meandering series string and interrogate in a random sequence. This also requires $4 \times \sqrt{n} + 2$ terminals. A fourth alternative is to provide a meandering sensor or string, two platelets and three driving arrays, the center array being shared, thus requiring $3 \times \sqrt{n} + 2$ terminals. A fifth alternative is to provide word organized memories in which the interrogation and detection functions are structured in functional groups. Another alternative is to use the two juxtaposed platelets with the magnetoresistor network between them as a correlator. A match between the domain pattern stored in the two platelets is then indicated by the presence or absence of a signal from the magnetoresistors. This logic function is again a magnetoresistive readout analog of the optical readout correlator discussed in my above noted copending application.

In the manufacture of devices having X–Y drive conductor arrays configured as illustrated in FIG. 4, the packing density or memory capacity is of course determined by feasible conductor sizes and spacing. The conductors deposited in the submerged grooves can easily be terminated on terminal strips which are provided in the manner illustrated in FIGS. 5 and 6 and will normally then be connected to input and output signal conducting wires by electron beam welding or other suitable techniques. It is thus really the wire dimensions which serve to set the limit on practical packing densities. At the input sides of each conductor pattern array, it is necessary to provide one wire per bit for each of the X and Y directions. A commonly used wire is 32 gauge which has a diameter of 7.9 mils or 0.00795 inches. Equivalent spacing can be provided if a wire having an actual wire diameter of 200 microns which equals 1/5 of a millimeter and 0.008 inches and having a total insulation thickness of 100 microns or 1/10 of a millimeter or 0.004 inches is used to give a total wire thickness of 0.012 inches or 0.3 millimeters. This then affords a minimum packing density of 3 ⅓ wires per millimeter or 33 wires per centimeter. Even at these relatively unsophisticatedly large dimensions, this indicates a packing density of 1,089 bits per square centimeter. This number is based on the largest outside dimensions of the device shown in FIG. 6 since insulated wires are connected at the outer edge. The platelets inside are much smaller, but the submerged etched conductor patterns can, as required, be fanned in and narrowed down by standard photolithographic techniques. Assuming eight five layer sandwiches of the type shown in FIG. 4 per centimeter of sandwich thickness, we obtain a volume packing density of 8,712 bits per cubic centimeter.

When a drive conductor plate and crystal platelet assembly as shown in FIG. 4 has been fabricated, it can be assembled and packaged in the manner illustrated in FIGS. 5 and 6 which is substantially as disclosed in my copending application entitled "Packaging Structure for Movable Magnetic Domain Devices" which was filed concurrently herewith. Thereafter, the generation and entrapment of a single magnetic domain at each intersection position can be carried out by the method disclosed in my earlier filed application Ser. No. 205,095.

In order to illustrate the applicability of the above referenced packaging concept to this device, the exploded view of FIG. 5 and the assembled view of FIG. 6 show how the specific components of FIG. 4 are incorporated in an actual device.

In FIGS. 5 and 6 the magnetic frame members 50 and 51 are shaped as square ring magnets, the inner aperture of each of which is a square having dimensions such that it will just receive the glass plate 41 or 43, respectively, and the crystal platelets 22 and 32. The magnetic member 51 is similarly shaped and configured. Both of these package-forming magnetic members 50 and 51 are formed from a material which has the dual properties of being both a high coercivity permanent magnet and an electrical insulator in order to provide the required bias field which will normally be in the range of 15 to 80 ersteds as taught in greater detail in my above referenced concurrently filed application. The glass plate 41 bearing the conductor pattern is bonded onto a package cover glass 52 which is larger than the magnetic member 50 in its outer dimensions and which has the conductor patterns continued by etching and deposition to bring them out to the edge of the plate which serves as a terminal strip. The glass plate 43 is similarly mounted on a cover plate 53 which also extends the conductor pattern to its edges which serve as a terminal strip. The central glass plate 42 shown in FIG. 4 is, in production, made larger than plates 41 and 43. That is to say, like the cover plate 52 and 53, its dimensions are greater than those of the biasing ring magnets 50 and 51 so that the conductor patterns on it may be extended out to the edges for external connection purposes.

The members shown in FIG. 5 are then assembled and bonded to form the compact package shown in FIG. 6. This completely solid state compact device then provides high speed random access in a non-destructive readout mass memory which is entirely solid state in its fabrication. It will, of course, be realized that dimensions shown in the drawings are greatly enlarged and not necessarily to rule. For example, the crystal platelets 22, 23 and glass plates 41, 42, 43 may range from 0.01 to 0.03 centimeters in thickness. The thickness and configuration of the magnetic members 50 and 51 depends upon the bias field strength requirements of the particular crystal used and upon the number of sandwich assemblies packaged in a single device.

What is claimed is:

1. In a digital signal translating device:

a. first and second crystal platelets of a type which is capable in the presence of a magnetic biasing field of sustaining discrete movable magnetic domains;

b. means to establish in said crystal platelets a magnetic biasing field having a direction and magnitude operative to sustain such discrete magnetic domains;

c. signal responsive means for moving at least one of said magnetic domains in one of said crystal platelets; and d. magnetoresistive sensor means positioned to be responsive to the direction of the coupling field between the magnetic field of said movable domain and that portion of the field of the other of said crystal platelets which couples to it to indicate by the value of its resistance whether a magnetic domain is or is not present in the position in the other of said crystal platelets from which said coupled portion of its field originates.

2. A device as in claim 1 wherein said magnetic bias field establishing means comprises a housing member for said device, said housing member consisting of a material which is both a high coercivity permanent magnet and an electrical insulator.

3. A device as in claim 1 wherein said means for moving said magnetic domain comprises an electrical conductor array submerged into the surface of at least one glass plate positioned in magnetic field coupled relationship to at least one of said crystal platelets.

4. A magnetic memory comprising:

a. first and second sheets of magnetic material positioned in magnetically coupled relationship to each other, each of said sheets being of a type capable of sustaining discrete movable magnetic domains therein;

b. field generating means to define in said first sheet of magnetic material a set of predetermined positions for said magnetic domains to represent bits of digital information to be retained in memory by the presence or absence of magnetic domains in said positions; and c. interrogator means comprising magnetoresistive sensor means positioned to be responsive to the juxtaposition of a magnetic domain in said second sheet of magnetic material with one of said predetermined positions in said first sheet of material to indicate by the resulting resistance value of said sensor the presence or absence of a magnetic domain in said one predetermined position in said first sheet of material to thereby afford a nondestructive readout of said stored bit of digital information.

5. A memory as in claim 4 and further including magnetic bias field establishing means comprising a housing member for said memory, said housing member consisting of a material which is both a high coercivity permanent magnet and an electrical insulator.

6. A memory as in claim 4 wherein said field generating means comprises an electrical conductor array submerged into the surface of at least one glass plate positioned in magnetic field coupled relationship to at least one of said sheets of magnetic material.

7. A magnetic memory for digital information comprising:

a. first and second uniaxially anisotropic ferromagnetic crystal platelets having their major plane surfaces cut perpendicularly to the easy axis of magnetization of said crystals and being capable in the presence of an externally applied magnetic biasing field of sustaining cylindrical magnetic domains having their cylinder axes lying along said easy axis of magnetization;

b. means to define an array of predetermined positions in each of said crystals, each of said predetermined positions being one of a plurality of continguous domain retaining areas defined at each intersection of a rectangular coordinate array of magnetic field generating conductors for creating a local magnetic field pattern at said intersection;

c. means for permanently maintaining in each of said crystals a predetermined number comprising at least one cylindrical magnetic domain at each of said intersections of said rectangular coordinate arrays;

d. write circuit means to move said cylindrical magnetic domain in one of said crystals only within said plurality of contiguous domain retaining areas at said intersection to position said domain in response to signals representative of the binary value of a bit of digital information so that the position of said domain is a retained memory representation of the value of said bit of digital information; and e. read circuit means comprising a magnetoresistive sensor means responsive to the position of a magnetic domain in said second crystal to detect the location of said cylindrical magnetic domain in said first crystal within said plurality of areas at any preselected one of said intersections.

8. A magnetic memory as in claim 7 wherein said magnetic domain maintaining means comprises a magnetic bias field established by a housing member for said device, said member consisting of a material which is both a high coercivity permanent magnet and an electrical insulator.

9. A magnetic memory as in claim 7 wherein said array defining means comprises a pattern of electrical conductors submerged into the surface of at least one glass plate positioned in magnetic field coupled relationship to at least one of said crystal platelets.

10. A magnetic bubble random access memory having a nondestructive readout means comprising:

a. magnetic bubble domain supporting means;

b. write circuit means comprising a first movable magnetic domain positioning array of field generating electrical conductors;

c. read circuit means comprising a second movable magnetic domain positioning array of field generating electrical conductors electrically insulated from said first array of conductors; and d. magnetoresistive thin film sensor circuit means positioned in magnetically coupled relationship to at least a first magnetic domain which can be positioned by signals applied to said first array and a second magnetic domain which can be positioned by signals applied to said second array, the actual value of the resistance of said magnetoresistive sensor within a range of predetermined possible values of resistance affording a nondestructive readout of digital information represented by the position of said first domain as determined by signals which have been applied to said first array by indicating the direction of the coupling flux lines between said first and second domains with respect to said magnetoresistive thin film sensor.

11. A memory as in claim 10 and further including magnetic bias field establishing means comprising a housing member for said memory, said housing member consisting of a material which is both a high coercivity permanent magnet and an electrical insulator.

12. A memory as in claim 10 wherein each of said arrays of field generating electrical conductors is submerged into at least one surface of at least one glass plate positioned in magnetic field coupled relationship to at least one of said magnetic bubbles.

* * * * *